March 26, 1968 J. H. TAVEL 3,375,381
CORDLESS ELECTRIC VIBRATOR FOR USE ON THE HUMAN BODY
Filed June 30, 1966
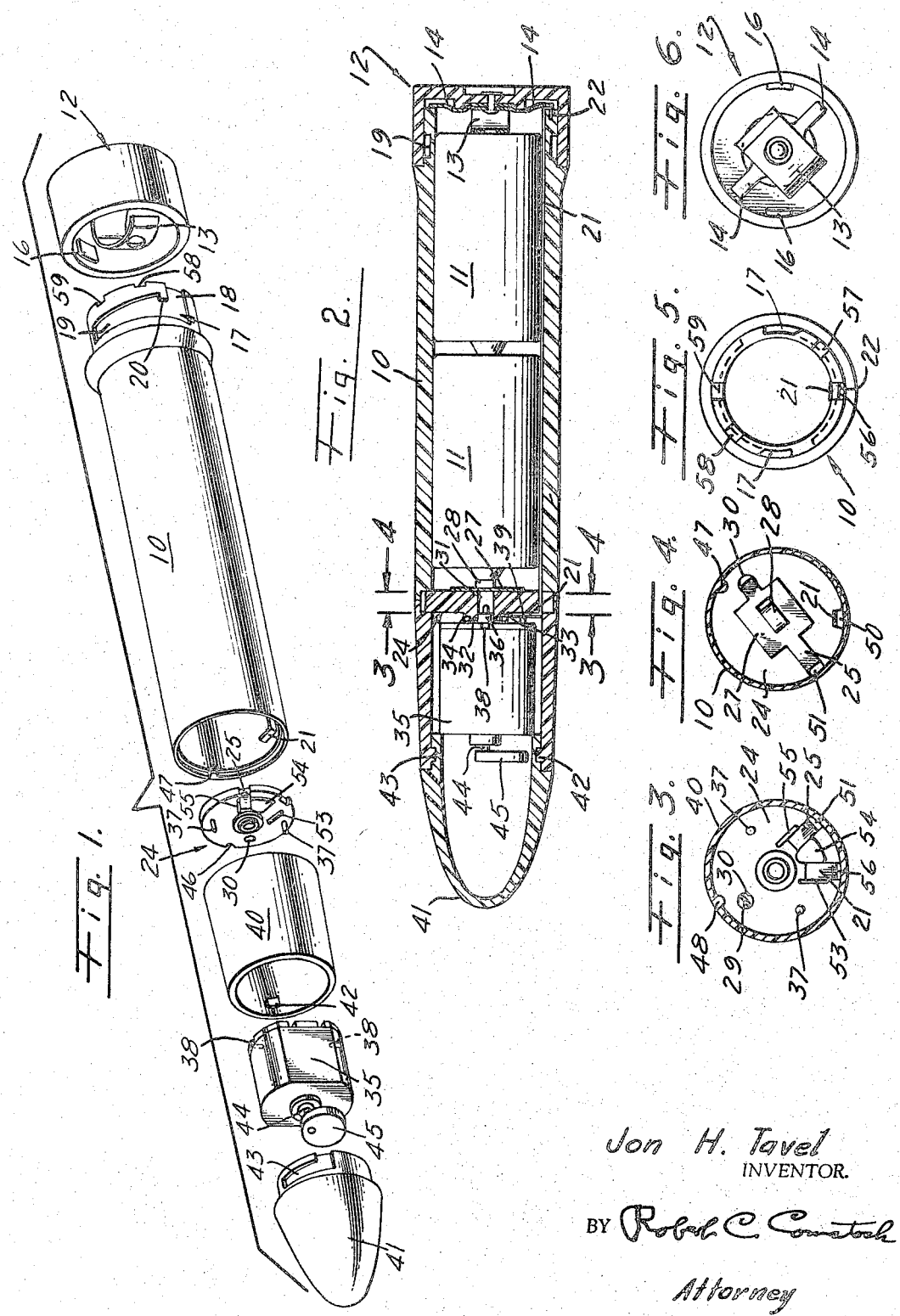
Jon H. Tavel
INVENTOR.
BY Robert C. Comstock
Attorney United States Patent Office 3,375,381
Patented Mar. 26, 1968

3,375,381
CORDLESS ELECTRIC VIBRATOR FOR USE ON THE HUMAN BODY
Jon H. Tavel, Encino, Calif., assignor to Vibrex Corporation, Woodland Hills, Calif., a corporation of California
Filed June 30, 1966, Ser. No. 561,867
5 Claims. (Cl. 310—81)

This invention relates to a cordless electric vibrator which is adapted for use on the human body.

It is among the objects of my invention to provide such a device which is substantially small and compact, so that it is capable of being held in one hand and applied to any part of the body.

My invention provides a vibrator which is simple and unusually compact in its structure and operation, so that it is economical to manufacture and easy to repair. No wires or soldering connections are used and only one eyelet is required in the assembly of the entire device. The vibrator is quiet in operation and the exterior portion which is applied to the body is waterproof and can be washed.

Another object of my invention is to provide a switch which is operated through rotation of the end cap which holds the batteries, so that no external switch is required or used. This provides a smooth external appearance for the vibrator. The end cap is provided with stop means to prevent accidental removal of the batteries when the switch is operated.

A further object of my invention is to provide such a device in which the batteries can be reversed in order to reverse the direction of rotation of the motor. Such reversal increases the life of the motor by reducing or spreading the wear on the brushes due to physical abrasion and the deterioration due to electrolysis.

In addition to being useful as a vibrator, the device is also capable of being used to vibrate a number of other things, such as hair brushes, tooth brushes, polishing devices, etc.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings:

FIG. 1 is an exploded perspective view of my vibrator;

FIG. 2 is a longitudinal sectional view of the same fully assembled;

FIG. 3 is a sectional view of the same, taken along line 3—3 of FIG. 2;

FIG. 4 is a sectional view of the same, taken along line 4—4 of FIG. 2;

FIG. 5 is an end view of the battery housing taken from the right hand side of FIG. 2, with the batteries and end cap removed;

FIG. 6 is an end view of the inside of the end cap.

A preferred embodiment which has been selected to illustrate my invention comprises an elongated cylindrical battery housing 10, which may be conveniently formed of molded plastic or other suitable material. The battery housing 10 is adapted to receive and hold a pair of flashlight batteries 11 in the same end to end relationship in which batteries are mounted in a flashlight.

The lower end of the battery housing 10, which is disposed at the right hand side of FIGS. 1 and 2 of the drawings, is open and is adapted to removably receive an end cap 12. The end cap 12 has a base and an adjoining circular side wall. The end cap 12 is removably and rotatably mounted on the lower end of the battery housing 10. The end cap 12 serves two purposes—it holds the batteries 11 within the battery housing 10 and it acts as an on-off switch to control the flow of electrical current to the motor, as described hereafter.

Mounted on the inside of the base of the end cap 12 is a substantially U-shaped contact spring 13, the lower part of which is in physical and electrical contact with the mid-portion of a pair of contact arms 14, which extend outwardly on opposite sides of the contact spring 13 to adjacent the side wall of the end cap 12. The contact spring 13 and contact arms 14 are held in place by an eyelet 15, which is secured to the center of the end cap 12.

The inside of the side wall of the end cap 12 is provided with a pair of diametrically spaced bosses 16, which protrude inwardly a short distance. The outside of the lower end of the battery housing 10 is provided with a pair of substantially L-shaped slots 17, which have a short axial leg 18 connecting with a substantially longer transverse leg 19. The bosses 16 are dimensioned and adapted to slidably move into the open lower end of the short axial legs 18 of the slots 17 and then move from the upper end of the axial legs 18 into the transverse legs 19.

The lower edge of each of the transverse legs 19 of the slots 17 is angled slightly downwardly from its closed end toward its junction with the axial leg 18. A short stop 20 is disposed at one end of the lower edge of each of the transverse legs 19, directly adjacent to the intersection of the transverse leg 19 with the axial leg 18. The stop 20 acts to engage the boss 16 in its counterclockwise movement along the axial leg 18. The boss 16 can be moved past the stop 20 only by moving the end cap 12 inwardly against the pressure of the contact spring 13. The stop 20 according prevents accidental removal of the end cap 12 and batteries 11 and permits such removal only when the end cap 12 is moved inwardly and then rotated past the stop 20.

An elongated flat contact strip 21, which may be formed of copper or other suitable electrically conductive material, extends along the inner wall of the battery housing 10 for its entire length. The lower end of the contact strip 21 is bent back on itself to extend into a slot 22 which extends axially into the lower end of the battery housing 10.

The upper end of the contact strip 21 extends through a notch 50 in the periphery of a disc 24 which extends across the upper end of the battery housing 10. The upper end of the contact strip 21 is bent to extend radially inwardly between protuberances 53 and 54 formed on the upper surface of the disc 24.

A second contact strip 25 has one end thereof disposed between protuberances 54 and 55 on the upper surface of the disc 24 radially spaced from the first contact strip 21. The second contact strip 25 is formed integrally with a contact plate 27, which extends along the lower surface of the disc 24. The second contact strip 25 is bent to extend through a notch 51 in the periphery of the disc 24. The contact plate 27 has a downwardly struck contact 28 which resiliently engages the contact of the adjacent battery 11. A short tab 29 at the opposite side of the contact plate 27 extends upwardly through a hole 30 in the disc 24, to help hold the contact plate 27 in position.

The disc 24 is provided with a central opening 31, which is surrounded by a concentric circular ring 32 and seat 33. A resilient O-ring 34 is mounted on the seat 33 surrounding the ring 32. A small direct current electrical motor 35 is mounted on the upper end of the disc 24. While any suitable type of motor may be used, the one illustrated in the drawings is a Mabuchi FM 25 of the type commonly used in miniature slot racing cars.

The motor 35 has a projecting portion 36 which fits into the opening 31 in the center of the disc 24. The O-ring 34 is disposed between the bottom of the motor 35 and the disc 24 and it acts to provide a resilient cushion-like mounting which reduces noise.

The upper side of the disc 24 is provided with a pair of elongated locator pins 37 which fit loosely in a pair of grooves 38 which are disposed on opposite sides of the motor 35. The locator pins 37 and grooves 38 orient the motor 35 so that its two downwardly directed contact pins 39 engage and make electrical contact with the portions of the contact strips 21 and 25 which extend along the upper side of the disc 24.

A cylindrical motor housing 40 surrounds the motor 35. The lower end of the motor housing 40 is secured to the upper end of the battery housing 10 by electronic fusion, adhesive or other suitable means, preferably waterproof, with the periphery of the disc 24 being held between the battery housing 10 and the motor housing 40.

A conical end member 41 is removably connected to the upper end of the motor housing 40. The inner wall of the motor housing 40 is provided with a pair of diametrically spaced square bosses 42 which extend into L-shaped slots 43 in the end member 41 in substantially the same manner in which the end cap 12 is connected to the battery housing 10. There is no stop 20 or the equivalent thereof. The lower edge of the transverse portion of each of the slots 43 is preferably slightly angled so that the end member 41 fits progressively more tightly as the bosses 42 move toward the ends of the transverse portions of the slots 43. The engagement between the end member 41 and the motor housing 40 should also preferably be waterproof, so that the entire upper end portion of the vibrator can be washed.

The motor 35 in operation rotates a shaft 44 on which a weight 45 is eccentrically mounted. The periphery of the disc 24 has an arcuate groove 46 into which projections 47 and 48 carried by the battery housing 10 and motor housing 40 fit, in order to orient the parts with respect to each other.

The lower end of the battery housing 10 is provided with a square indentation 56 which overlies the slot 22, so that the contact strip 21 overlies the inner half of the base of the indentation 56. A second indentation 57 is radially spaced a short distance from the indentation 56. A matching pair of indentations 58 and 59 are disposed diametrically from the indentations 56 and 57.

The indentations 56–59 are oriented so that when the bosses 16 are disposed away from the closed end of the transverse legs 19 of the slots 17, the vibrator is in an "off" position and neither of the contact arms 14 is disposed in the indentation 56.

When the end cap 12 is rotated in a clockwise direction with respect to the battery housing 10, moving the bosses 16 to the closed ends of the transverse legs 19 of the slots 17, the contact arms 14 are moved into alignment with the indentations 56–59. The contact arms are urged into the indentations 56 and 59 by their own resilience, bringing one of the contact arms 14 into engagement with the portion of the contact strip 21 disposed within the indentation 56. When this occurs, an electrical circuit is completed through the batteries 11 and motor 35, to operate the motor. The vibrator is then in an "on" position.

When the motor 35 is in operation, it rotates the shaft 44 and eccentrically mounted weight 45. The eccentric mounting of the weight 45 imparts rapid vibration to the vibrator, such vibration being strongest around the end member 41 and motor housing 40. The vibrator and particularly these parts thereof may then be applied to any part of the body to convey the vibration to the body.

If the end cap 12 is rotated a short distance counter-clockwise, the bosses 16 will move away from the closed ends of the transverse legs 19 and the contact arms 14 will move out of the indentations 56 and 59, thus breaking the electrical contact between the contact arm 14 and the contact strip 21. The motor 35 will then cease to operate. If the end cap 12 is rotated a sufficient distance to bring the contact arms 14 into orientation with the indentations 57 and 58, the contact arms 14 will move into those indentations.

It may be noted that the duplication of the contact arms 14 and indentations 56–59 makes it possible for the user to insert either of the bosses 16 into either of the slots 17 and the switch will still operate in the same manner.

It will be noted that if the motor 35 should need to be removed for replacement or repair, the user need only unscrew the end member 41 and turn the vibrator upside down. The motor 35 will then drop out and a new motor 35 can be inserted in its place.

I claim:

1. In a cordless electric vibrator for use on the human body having an elongated substantially cylindrical battery housing, at least one dry cell battery mounted within said housing and vibratory means operatively connected to said battery, an end cap removably and rotatably mounted on one end of said housing, said end cap acting to hold said battery within said housing and also acting as a switch to control the operation of said vibrator, said cap having a base and a circular side wall, at least one inwardly directed projection carried by the inside of said side wall, at least one L-shaped slot having an open vertical portion connected to a closed horizontal portion, said slot extending along the outer periphery of the end of said housing on which said end cap is mounted, said projection being slidably movable into the open vertical portion of said slot and along the horizontal portion thereof to removably mount said end cap on said housing, an elongated contact strip extending along the inside of said housing, said contact strip having one end thereof disposed adjacent to the end of said housing on which said end cap is mounted, a contact arm fixedly secured on the inside of the base of said end cap and rotatable therewith, said contact arm having at least one free end disposed adjacent to the circular side wall of said cap, said end of said contact strip and said contact arm being completely separate and independent from said projection and L-shaped slot, said contact arm being electrically connected to one of the contacts of said battery, said end cap being rotatable with respect to said housing to move said projection reciprocally along the horizontal portion of said slot and to simultaneously move said contact arm into and out of electrical contact with said end of said contact strip, the positioning of said projection with respect to the closed end of the horizontal portion of said L-shaped slot being so related to and coordinated with the positioning of said contact arm with respect to the end of said contact strip that when said projection engages the closed end of the horizontal portion of said L-shaped slot, said contact arm simultaneously engages the end of said contact strip, so that said end cap is in "on" position and cannot be rotated past said "on" position.

2. The structure described in claim 1, the end of said housing on which said end cap is mounted having a longitudinally axial slot, the end of said contact strip being bent back upon itself and extending a substantial distance into said axial slot to anchor said contact strip against movement with respect to said housing.

3. The structure described in claim 1, and a stop member projecting into the horizontal portion of said L-shaped slot, said stop member being spaced from the closed end of the horizontal portion of said slot and being disposed before the intersection of the horizontal and vertical portions of said slot, said stop member having a substantially straight wall, said projection having a substantially straight wall adapted to engage the straight wall of said stop member upon the rotation of said end cap away from said "on" position to prevent any further rotation of said end cap and thus prevent the accidental removal of said end cap from said housing, said end cap adapted to be moved directly toward said housing along the longitudinal axis of said housing to move said walls out of engagement with each other and thereafter permit the further rotation and removal of said end cap.

4. The structure described in claim 1, the end of said housing on which said end cap is mounted having a pair of diametrically opposed indentations, one of said indentations having a slot extending parallel to the longitudinal axis of said housing, the end of said contact strip being bent back upon itself and extending across the inner part of said indentation and a substantial distance into said slot, to anchor said contact strip against movement with respect to said housing, said indentations being dimensioned to receive the free ends of said contact arm.

5. The structure described in claim 4, the end of said housing on which said end cap is mounted having a second pair of diametrically opposed indentations spaced from said first named pair of indentations, said second pair of indentations also being dimensioned to receive the free ends of said contact arm.

References Cited

UNITED STATES PATENTS

| | | | |
|---|---|---|---|
| 3,264,464 | 8/1966 | Gits | 200—60 |
| 3,176,092 | 3/1965 | Lukasek | 200—60 |
| 3,196,299 | 6/1965 | Kott | 310—50 |
| 2,519,215 | 8/1950 | Appleton | 200—157 |
| 2,454,667 | 11/1948 | Morse | 200—157 |
| 2,225,936 | 12/1940 | Williams | 200—60 |
| 3,096,757 | 6/1963 | Berard | 128—36 |
| 3,183,538 | 5/1965 | Hubner | 15—22 |
| 2,863,445 | 12/1958 | Johnson | 128—24.2 |

MILTON O. HIRSHFIELD, *Primary Examiner.*

J. D. MILLER, *Examiner.*